US 7,486,666 B2

(12) United States Patent
Meyer

(10) Patent No.: US 7,486,666 B2
(45) Date of Patent: Feb. 3, 2009

(54) ROGUE AP ROAMING PREVENTION

(75) Inventor: David A. Meyer, Levittown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 463 days.

(21) Appl. No.: 11/191,391

(22) Filed: Jul. 28, 2005

(65) Prior Publication Data

US 2007/0025334 A1   Feb. 1, 2007

(51) Int. Cl.
G06F 15/177 (2006.01)
G06F 17/00 (2006.01)
H04L 12/66 (2006.01)
(52) U.S. Cl. ............... 370/352; 707/104.1; 707/109; 707/221
(58) Field of Classification Search ............. 370/352; 707/109, 104.1; 709/221
See application file for complete search history.

(56) References Cited

U.S. PATENT DOCUMENTS 7,016,948 B1 * 3/2006 Yildiz .................. 709/221

2003/0142641 A1   7/2003 Sumner et al.
2004/0107219 A1*  6/2004 Rosenberger ......... 707/104.1
2005/0128989 A1   6/2005 Bhagwat
2007/0025334 A1*  2/2007 Meyer ................... 370/352

FOREIGN PATENT DOCUMENTS

WO   2005018162 A1   2/2005

OTHER PUBLICATIONS

International Search Report dated Jan. 16, 2008 for PCT Application Serial No. PCT/US06/22979, 3 Pages.

* cited by examiner

Primary Examiner—William D Cumming
(74) Attorney, Agent, or Firm—Amin, Turocy & Calvin, LLP

(57) ABSTRACT

A system and/or a method that facilitates enhancing security in a wireless network for a mobile device that can connect to an access point by providing the mobile device with an association control list for intrusion protection is provided. A mobile device can utilize a wireless connection with at least one access point. In particular, the system includes a security component that utilizes the association control list to provide at least one of a valid access point to which the mobile can connect and a rogue access point to which the mobile device is not to connect, allowing the mobile device to eliminate and/or filter out any harmful access points that can be a potential safety hazard.

18 Claims, 10 Drawing Sheets

ROGUE AP ROAMING PREVENTION

BACKGROUND

Computer products and other networking equipment have emerged as one of the largest and fastest growing industries. With the rapid improvements made within the industry, electronic manufacturers continuously strive to satisfy the ongoing demand for products providing functionality without restrictions such as, for example, size, power consumption, compatibility, ergonomics, software capability, lifetime, range, productivity, usable-interface, security, speed, portability, etc.

One restriction the electronic industries have vastly improved upon is providing a range or degree of freedom associated with employment of wireless networks and/or devices. Wireless networks and/or devices such as, but not limited to, wireless local area networks (WLAN), BLUETOOTH®, sub-networks (e.g., wireless mouse and personal computer), portable digital assistants (PDA's), mice, keyboards, speakers, monitors, routers, phones, cellular communication devices, wireless devices, access points, . . . facilitate functionality with mitigation of wires and accompanied restrictions. In addition to providing degree(s) of freedom, wireless devices and/or networks are advantageous to hard-wired networks and/or devices for numerous reasons. Wireless systems are pleasing to the eye since the clutter of unwanted hard-wires is eliminated. For instance, plasma flat-screen televisions involve mounting on a wall similar to that of a painting mounted to a wall. By utilizing a wireless method and/or system, the wires for the television would not be seen hanging from the wall, and the result is a more pleasant looking, wall-mounted television. Furthermore, a hard-wire is a physical restriction by limiting the range of the device and/or network with the actual length of the wire. For example, a hard-wired Ethernet connection for a laptop can only be utilized within physical constraints of length of the Ethernet cable. Additionally, hard-wires have to be connected, which can involve matching an endless amount of plugs and connectors.

Not only are wireless networks and/or devices employed within the personal computer realm (e.g., wireless keyboards, mice, speakers, . . . ), but common households are increasing use of wireless home networks and/or devices. For example, broad-band connections are becoming more affordable for home users in which multiple personal computers anticipate connectivity. Dependant upon location of the personal computers, a network can be employed in order to distribute and utilize the broad-band connection. However, common problems of using hard-wires for the network can arise (e.g., cost, degree of freedom, eye-pleasing, . . . ). Thus, wireless networks and/or devices can be utilized in order to cure the foregoing problems.

Although benefits are apparent for wireless networks and/or devices, many problems arise involving installation of such products. With the increasing number of wireless networks, a difficulty arises to provide security to a wireless device with a particular network entity (e.g., wireless mouse with a personal computer, wireless speakers with a receiver, wireless access point with a router, wireless device with an access point, . . . ). Additionally, the network can be susceptible to harmful attacks from, for instance, a hacker. Such wireless network security can be seen as a negative in comparison to the benefits associated therewith.

Another complex problem involving wireless networks and/or devices involves security and authentication. Although wireless networks and/or devices provide a vast amount of benefits, a hard-wire network and/or device is typically more secure based at least upon the physical connection assumed to be authenticated. On the contrary, wireless networks and/or devices are prone to "sniffing" (e.g., the act of eavesdropping on messages such as, but not limited to, confidential business data or passwords in transit), rogue access points, and other hack techniques (e.g., port scanning, transfer communication protocol (TCP) spoofing, user datagram protocol (UDP) spoofing, TCP session spoofing, . . . ) which are utilized in order to intrude and exploit the wireless network security.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate enhancing security associated with a mobile device. A security component can provide enhanced security to a mobile device that utilizes a wireless connection. The mobile device, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection. The wireless connection can be, but is not limited to, wireless local area network (WLAN), BLUETOOTH®, wireless fidelity (WiFi), ultra wideband, etc. The security component can utilize an association control list, wherein the list can provide at least one of a valid list of internet protocol (IP) addresses and/or media access control (MAC) addresses and/or a list of invalid (e.g., rogue) IP addresses and/or media access control (MAC) addresses.

In accordance with one aspect of the claimed subject matter, the security component can create the association control list by adding a list of valid and/or invalid access points, wherein the address of the access points can be at least one of an IP address and/or a media access control (MAC) address. The security component can add an access point to the association control list by at least one of the following: adding a media access control (MAC) address of an access point; adding a range of media access control (MAC) addresses of access points; and adding a media access control (MAC) with a wild card character to match multiple MAC addresses.

In accordance with another aspect of the claimed subject matter, the security component can include a data store to provide storage for any association control list associated with the mobile device. For example, various association control lists can be stored for a portion of access points and/or all of the access points. Moreover, the mobile device can further include a wireless component that provides wireless connectivity to the access point. It is to be appreciated that the association control list can be specific to a particular wireless network. In other aspects of the claimed subject matter, methods are provided that facilitate enhancing security associated with a mobile device.

The following description and the annexed drawings set forth in detail certain illustrative aspects of the claimed subject matter. These aspects are indicative, however, of but a few of the various ways in which the principles of the innovation may be employed and the claimed subject matter is intended

DETAILED DESCRIPTION

Figure 1:
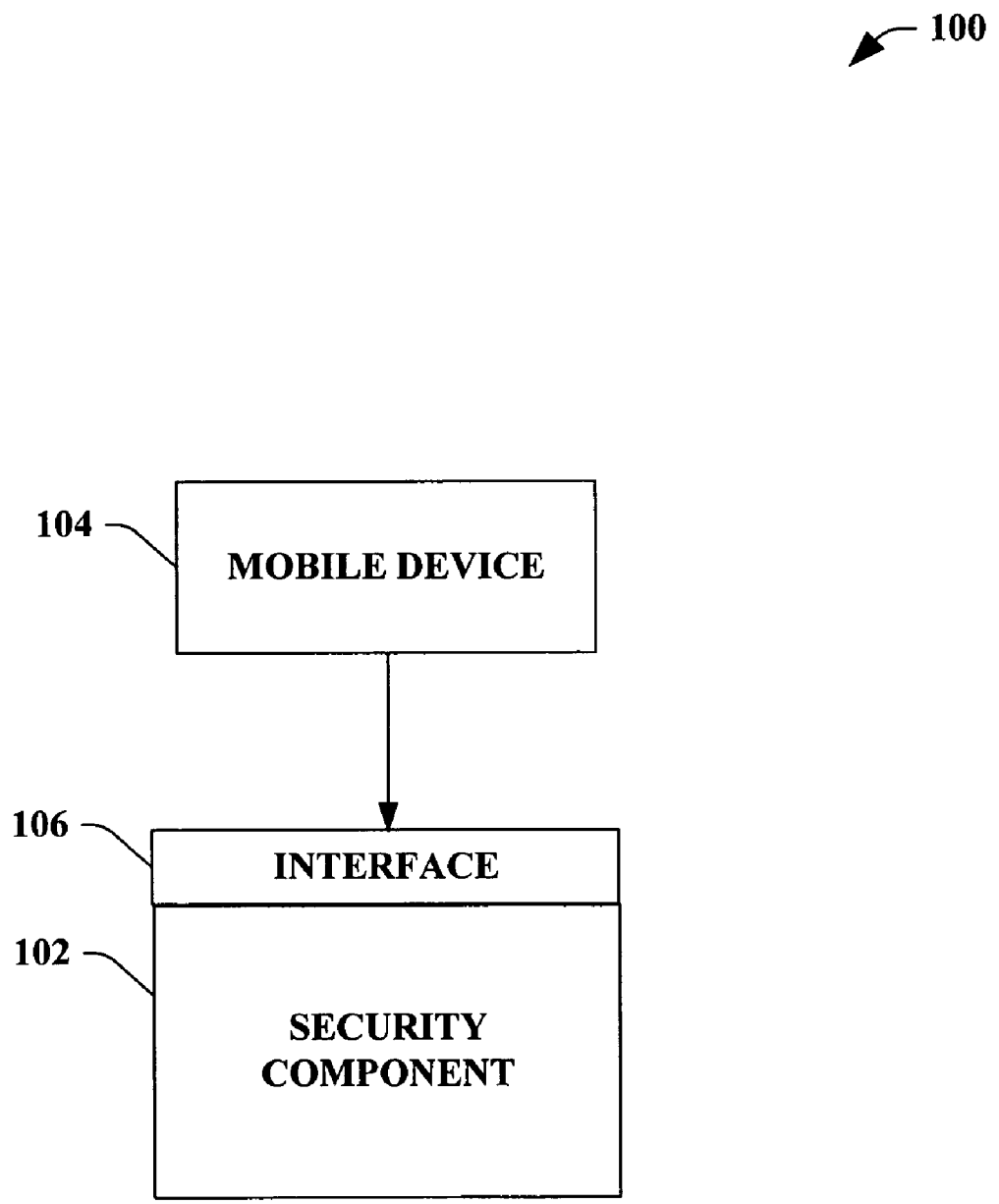
FIG. 1 illustrates a block diagram of an exemplary system that facilitates enhancing security associated with a mobile device.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates enhancing security associated with a mobile device. A security component 102 can provide enhanced security to a mobile device 104 that utilizes a wireless connection. The mobile device 104, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection. The wireless connection can be, but is not limited to, wireless local area network (WLAN), BLUETOOTH®, wireless fidelity (WiFi), ultra wideband, etc. The security component 102 can utilize an association control list, wherein the list can provide at least one of a valid list of internet protocol (IP) addresses and/or media access control (MAC) addresses and/or a list of invalid (e.g., rogue) IP addresses and/or media access control (MAC) addresses. In other words, the security component 102 provides a dynamic and/or static listing of addresses associated with a wireless connection to eliminate hostile and/or rogue attacks.

For instance, a mobile device 104 can be a laptop, wherein various access points can be utilized within a particular network to provide wireless connection. The laptop can utilize the security component 102 to provide a listing of invalid access points (e.g., rogue access points) and/or valid access points to increase security and/or protection associated with the wireless connection and/or network. For instance, a network administrator can create and/or provide the association control list to various mobile devices to allow enhanced protection. In another example, the association control list can be updated dynamically via email, download, and/or upload.

The security component 102 can add the association control list to the mobile device 104 by a plurality of techniques. The following examples can be implemented by the security component 102 but it is to be appreciated that any suitable technique can be utilized and the claimed subject matter is not so limited. In one instance, the media access control (MAC) address of access points can be added to the mobile device 104. Thus, the association control list can provide a listing of any valid access point associated with the wireless connection. In addition, the association control list can provide a listing of invalid access points associated with a rogue wireless connection. In another example, a range of MAC addresses of access points can be added the mobile device 104. The range of MAC addresses can include a listing of valid address and/or a listing of invalid address. In yet another example, a MAC address utilizing a wild card can be added to the mobile device 104. Thus, the association control list can contain a wild card character that allows addresses to be included on such a list. It is to be appreciated that although the above examples utilize MAC addresses, any suitable addresses can be utilized such as, for instance, an IP address.

In another example, a computer can utilize a wireless network card, wherein the security component 102 provides an association control list. A network administrator, for instance, can provide a wild card character "*" in a listing of an IP address to designate valid access points. Thus, an address of 101.01.01** can include the IP addresses 101.01.01.05, 101.01.01.38, etc. By providing such a listing of valid access point addresses, a rogue IP address and/or access point is not a threat to the computer and/or any other device utilizing such security component 102. It is to be appreciated and understood that the association control list can also provide a listing of invalid access point addresses and the claimed subject matter is not so limited.

Moreover, the system 100 can include any suitable and/or necessary interface component 106, which provides various adapters, connectors, channels, communication paths, etc. to integrate the security component 102 into virtually any operating and/or database system(s). In addition, the interface component 106 can provide various adapters, connectors, channels, communication paths, etc., that provide for interaction with the security component 102 and the mobile device 104.

Figure 2:
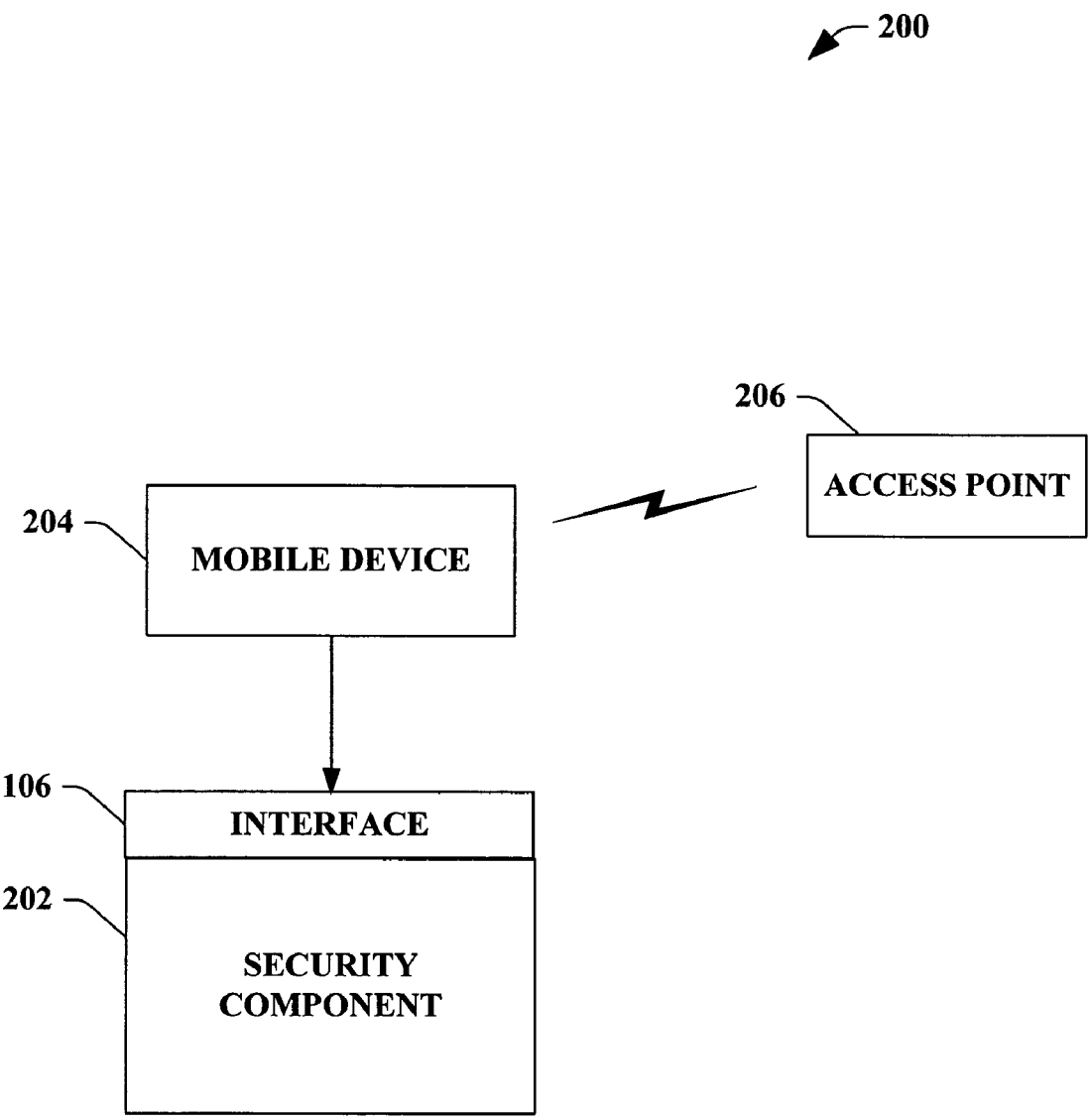
FIG. 2 illustrates a block diagram of an exemplary system that facilitates providing security in relation to a mobile device on a wireless network that utilizes an access point.

FIG. 2 illustrates a system 200 that facilitates providing security in relation to a mobile device on a wireless network that utilizes an access point. A security component 202 can enhance security associated with a mobile device 204 that utilizes a wireless connection in relation to an access point 206. The mobile device 204, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection that relates to the access point 206. The wireless connection can be, but is not limited to, wireless local area network, BLUETOOTH®, wireless fidelity, ultra wideband, etc. The security component 202 can utilize an association control list, wherein the list can provide at least one of a valid list of internet protocol (IP) addresses and/or media access control (MAC) addresses associated with the access point 206 and/or a list of invalid (e.g., rogue) IP addresses and/or media access control (MAC) addresses associated with a rogue access point. In other words, the security component 202 provides a listing of addresses associated with the access point 206 to eliminate hostile and/or rogue attacks. It is to be appreciated that the security component 202 and the mobile device 204 can be substantially similar to the security component 102 and the mobile device 104 described in FIG. 1 respectively.

For instance, a user and/or a network administrator can create an association control list that includes access point 206 valid addresses such that any mobile device utilizing the wireless connection can safely connect therewith. The list can be added to the mobile device 204 by at least one of the following: adding a MAC address of the access point 206; adding a range of MAC addresses that include the address of access point 206; and/or adding a MAC address with wild card characters to match multiple MAC addresses associated with the access point 206. It is to be appreciated that the association control list can also provide a list of invalid addresses as well as a list of valid address. It is to be appreciated that although the above examples utilize MAC addresses, any suitable addresses can be utilized such as, for instance, an IP address.

Figure 3:
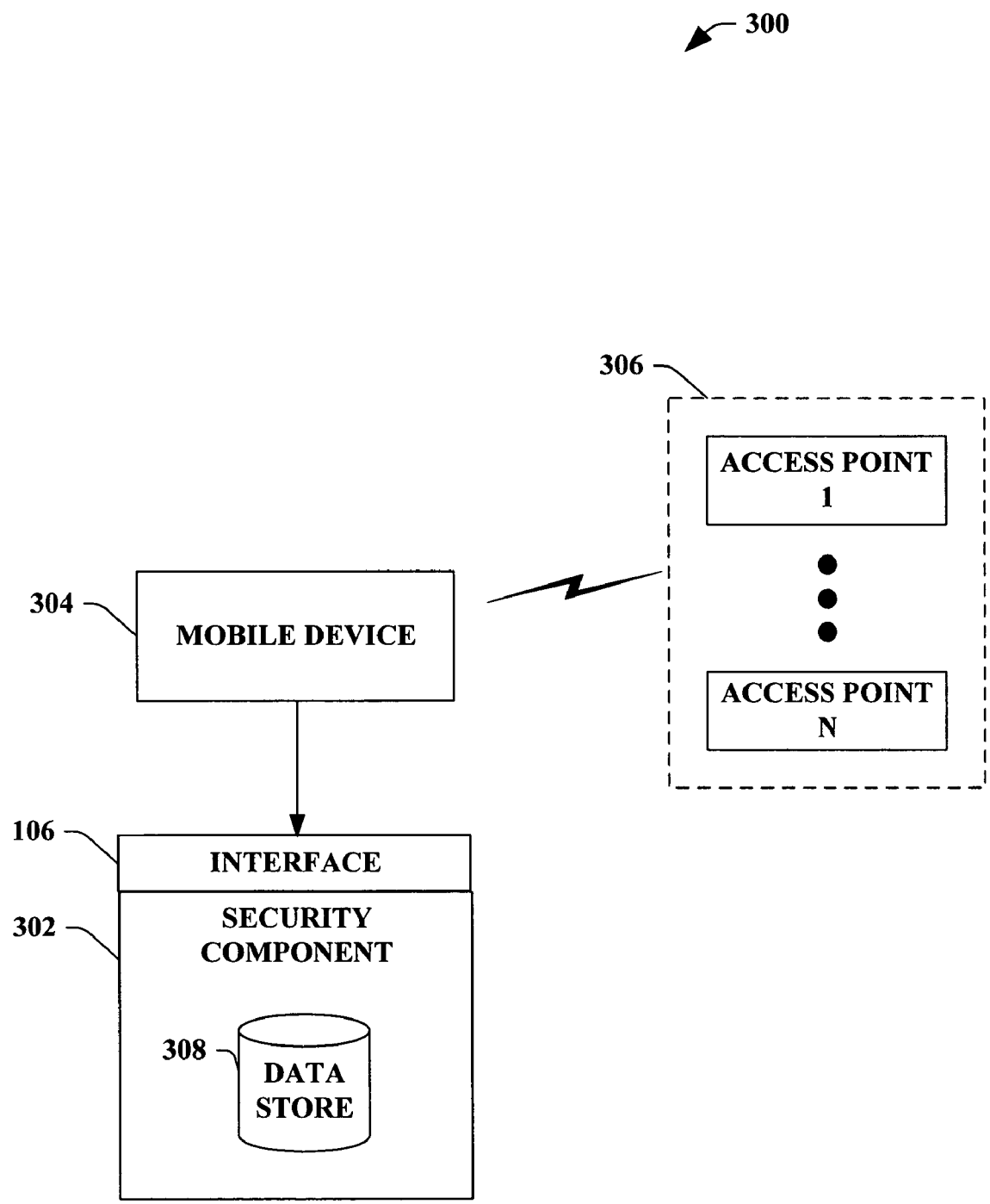
FIG. 3 illustrates a block diagram of an exemplary system that facilitates providing security to a mobile device that connects to a plurality of access points via wireless communication.

FIG. 3 illustrates a system 300 that facilitates providing security to a mobile device that connects to a plurality of access points via wireless communication. A security component 302 can provide an association control list to a mobile device 304, wherein the mobile device 304 utilizes a wireless connection via at least one access point 306. The security component 302 allows the mobile device 304 to connect to at least one access point 306 in confidence such that the address associated therewith is valid and not a rogue access point and/or rogue IP address. In other words, the mobile device 304 can eliminate and/or filter out any harmful access points that can be a potential safety hazard. The mobile device 304, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection that relates to at least one access point 306. The wireless connection can be, but is not limited to, wireless local area network (WLAN), BLUETOOTH®, wireless fidelity (WiFi), ultra wideband, etc. It is to be appreciated that the security component 302, the mobile device 304, and the access point 306 can be substantially similar to previously described components, devices, and/or access points.

The mobile device 304 can connect to a plurality of access points 306 to provide wireless connectivity. It is to be appreciated and understood that the mobile device 304 can connect via any number of access points 306 from 1 to N, where N is an integer greater than or equal to 1. In other words, the mobile device 304 can connect with any access point associated with the wireless connection when the address associated therewith is listed on the association control list created by the security component 302. It is to be appreciated that the security component 302 can be incorporated into the mobile device 304, a stand-alone component, and/or any combination thereof in order to provide enhanced security via the association control list. In addition, it is to be appreciated that the security component 302 can create and/or utilize a plurality of association control lists associated with a portion of the wireless network.

In one example, the security component 302 can provide additional security techniques in addition to the association control list. For instance, the security component 302 can provide security techniques such as, but not limited to, a user name and password, personal identification number (PIN), biometric indicia (e.g., fingerprint, inductance, retina), human interactive proofs (HIPs), voice recognition, etc. to further protect and/or safeguard the wireless connection associated with the mobile device 304.

The security component 302 can include a data store 308, wherein the data store 308 can store various data related to the system 300. For instance, the data store 308 can provide storage for the association control list. In addition, the data store 308 can provide storage for addresses, IP addresses, access points, mobile devices, usernames, passwords, network information, etc. The data store 308 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 308 of the subject systems and methods is intended to comprise, without being limited to, these and any other suitable types of memory. In addition, it is to be appreciated that the data store 308 can be a server, a database, a hard drive, and the like.

Figure 4:
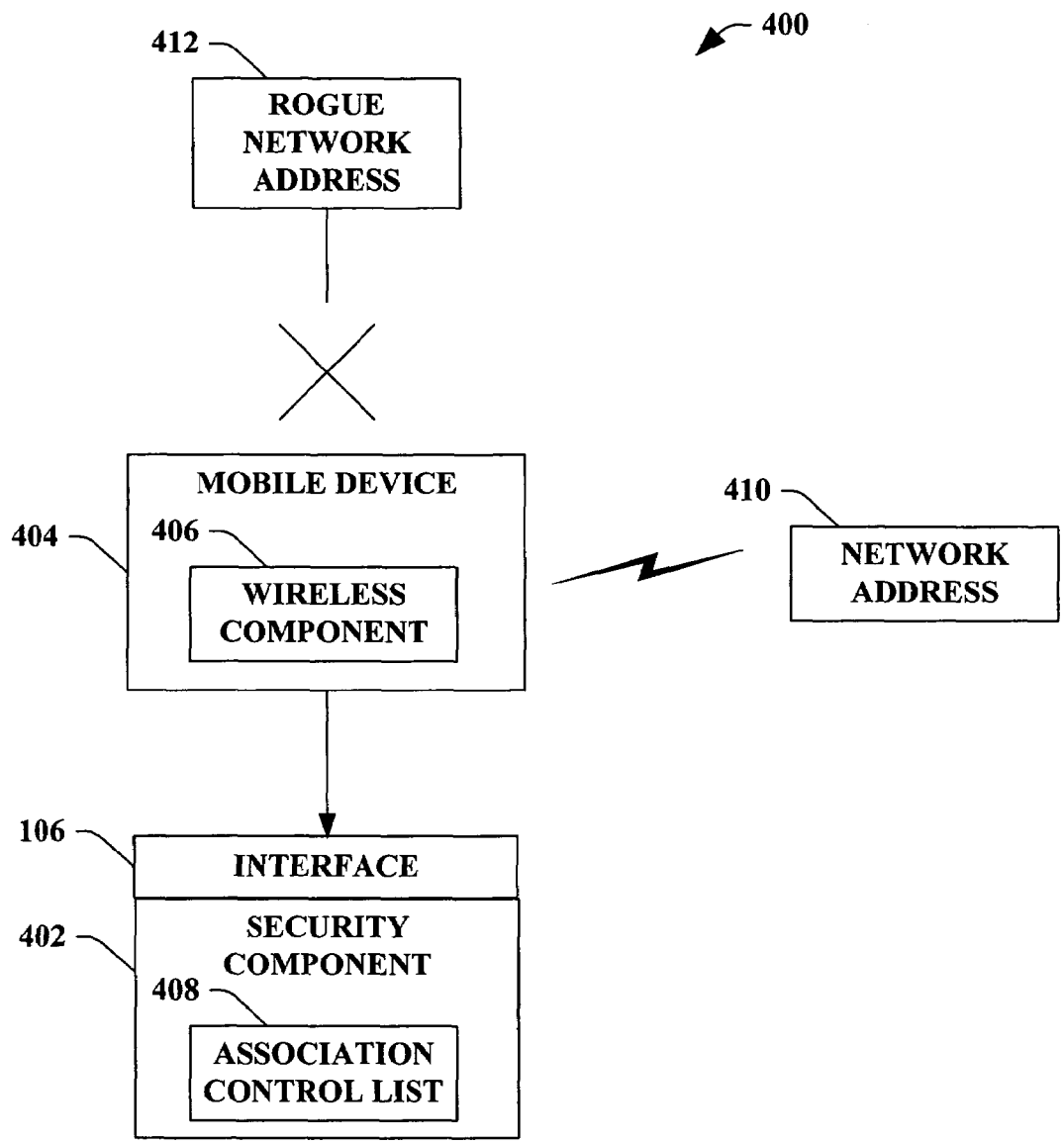
FIG. 4 illustrates a block diagram of an exemplary system that facilitates eliminating rogue access points that attack mobile devices.

FIG. 4 illustrates a system 400 that facilitates eliminating rogue access points that attack mobile devices. A security component 402 can create and/or implement an association control list 408 that provides at least one of a listing of valid access points and/or a listing of invalid access points. A mobile device 404 can connect via a wireless connection to at least one access point on a particular network. By allowing the mobile device 404 to connect to a valid address related to an access point, any rogue access points and/or rogue attacks can be prevented. The mobile device 404, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection that relates to the access point. The wireless connection can be, but is not limited to, wireless local area network (WLAN), BLUETOOTH®, wireless fidelity (WiFi), ultra wideband, etc. It is to be appreciated that the security component 402 and the mobile device 404 can be substantially similar to previously described components and devices.

The mobile device can include a wireless component 406 that provides wireless connectivity to any access point. However, the association control list 408 can provide a listing of valid and/or invalid addresses related to at least one access point, wherein the wireless component 406 can solely connect to a valid access point listed on such association control list 408. For instance, the mobile device 404 can connect to a network address 410 based at least in part upon the address being on the association control list 408. Yet, the mobile device 404 does not connect to a rogue network address 412 based at least in part upon the address being listed as an invalid address in the association control list 408 and/or the address not being listed as a valid address.

Figure 5:
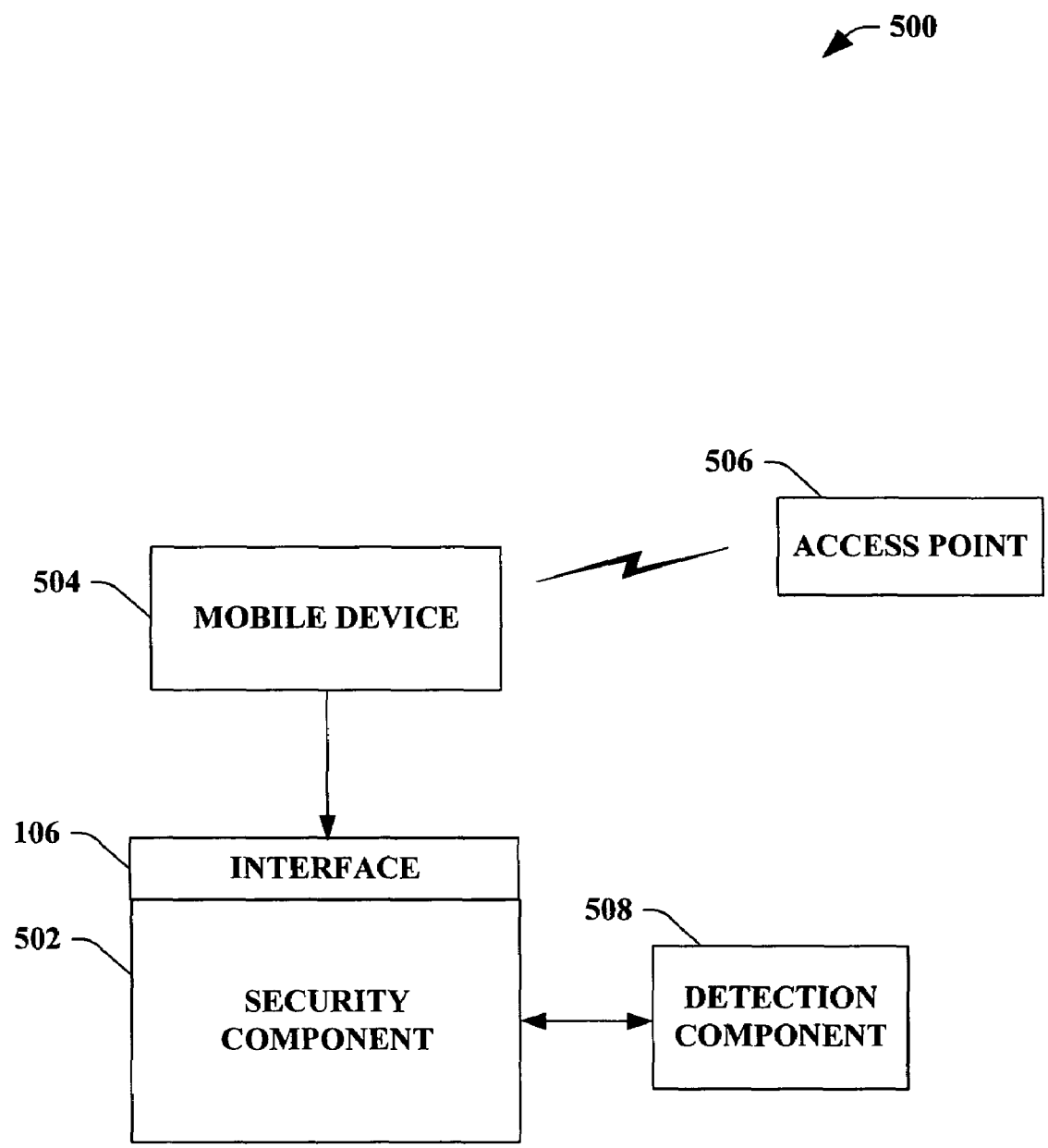
FIG. 5 illustrates a block diagram of an exemplary system that facilitates enhancing security for a wireless mobile device that utilizes access points.

FIG. 5 illustrates a system 500 that facilitates enhancing security for a wireless mobile device that utilizes access points. A security component 502 can enhance security associated with a mobile device 504 that utilizes a wireless connection in relation to an access point 506. The mobile device 504, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection that relates to the access point 506. The wireless connection can be, but is not limited to, wireless local area network (WLAN), BLUETOOTH®, wireless fidelity (WiFi), ultra wideband, etc. The security component 502 can utilize an association control list, wherein the list can provide at least one of a valid list of addresses associated with the access point 506 and/or a list of invalid (e.g., rogue) addresses associated with a rogue access point. In other words, the security component 502 provides a listing of addresses associated with the access point 506 to eliminate hostile and/or rogue attacks.

The security component 502 can utilize a detection component 508 to facilitate creating the association control list. The detection component 508 can provide rogue access point and/or rogue address detection, wherein such detection can be utilized to create a list of invalid addresses related to the association control list. It is to be appreciated that any suitable detection component 508 can be implemented. Moreover, the detection component 508 can utilize conventional techniques to sniff and/or detect rogue access points, rogue attempts to threaten a system, rogue addresses, etc.

For example, a network administrator and/or user can create an association control list of valid addresses related to at least one access point in a wireless network. The detection component 508 can detect various rogue access points and/or addresses, wherein the user and/or network administrator can then utilize such detection as a basis for creating a list of invalid addresses in the association control list. Thus, the detection component 508 provides the system 500 with an efficient and/or accurate technique to add invalid (e.g., rogue) addresses to the association control list.

Figure 6:
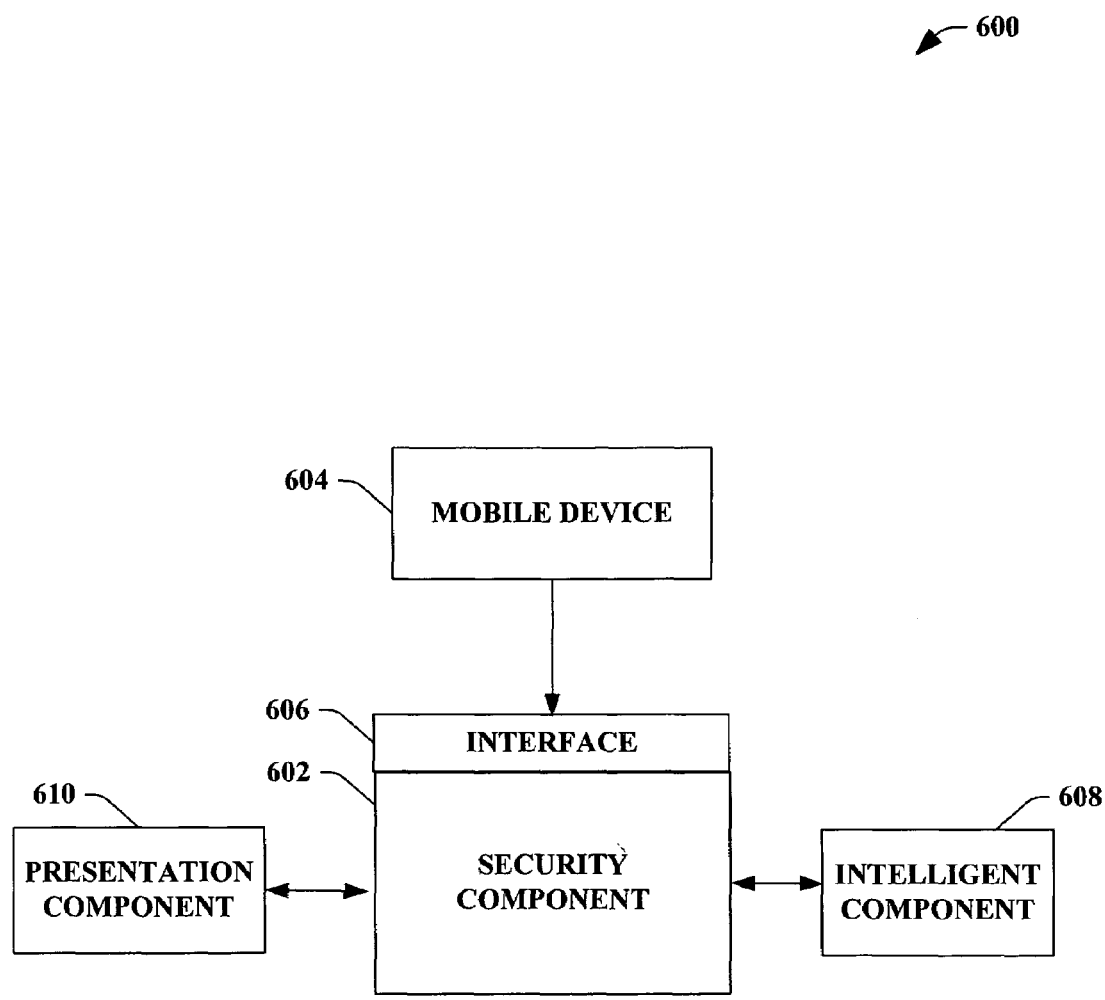
FIG. 6 illustrates a block diagram of an exemplary system that facilitates enhancing security associated with a mobile device.

FIG. 6 illustrates a system 600 that employs intelligence to facilitate enhancing security associated with a mobile device. The system 600 can include a security component 602, a mobile device 604, and an interface 606 that can all be substantially similar to respective components, devices, and interfaces described in previous figures. The system 600 further includes an intelligent component 608. The intelligent component 608 can be utilized by the security component 602 to facilitate enhancing security for the mobile device 604 in relation to connecting to an access point via a wireless connection. For example, the intelligent component 608 can infer the listing of addresses associated with valid access points, and/or the listing of addresses associated with invalid access points based at least in part upon historical data.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 610 can provide various types of user interfaces to facilitate interaction between a user and any component coupled to the security component 602. As depicted, the presentation component 610 is a separate entity that can be utilized with the security component 602. However, it is to be appreciated that the presentation component 610 and/or similar view components can be incorporated into the security component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the security component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
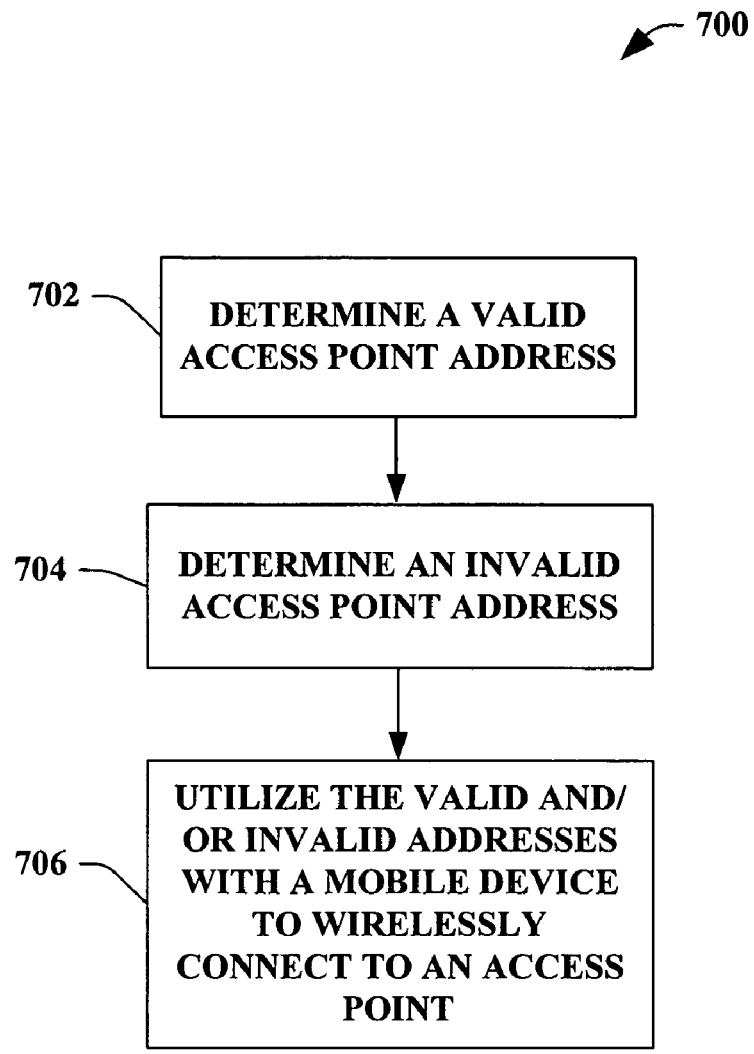
FIG. 7 illustrates an exemplary methodology for enhancing security for wireless networks and mobile devices.
Figure 8:
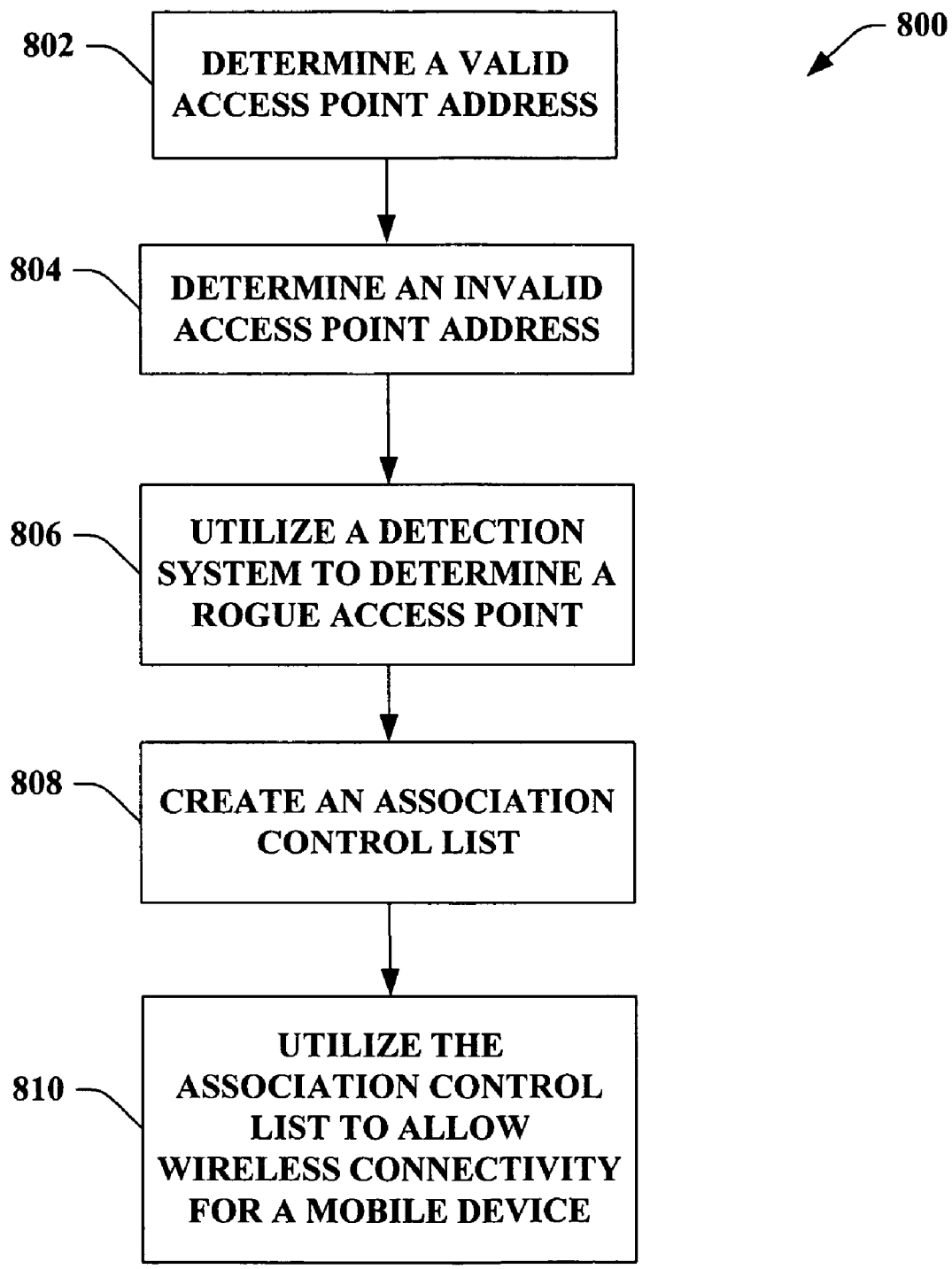
FIG. 8 illustrates an exemplary methodology that facilitates providing security in relation to a mobile device on a wireless network that utilizes an access point.

FIGS. 7-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 7 illustrates a methodology 700 for enhancing security for wireless networks and mobile devices. At reference numeral 702, a valid access point address is determined. For instance, a user and/or network administrator can initialize a wireless network utilizing various access points, wherein the user and/or administrator can determine the valid access points and/or addresses associated therewith. At reference numeral 704, an invalid (e.g., rogue) access point address can be determined. In one example, a user and/or network administrator can determine the invalid access point address. In yet another example, a detection system can be utilized to determine a rogue and/or invalid access point address. It is to be appreciated that the address can be an IP address and/or a MAC address.

At reference numeral 706, the valid and/or invalid addresses can be utilized by a mobile device to wirelessly connect to an access point listed as a valid address. The mobile device, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection that relates to the access point. The wireless connection can be, but is not limited to, wireless local area network (WLAN), BLUETOOTH®, wireless fidelity (WiFi), ultra wideband, etc. It is to be appreciated that the valid and/or invalid access point addresses can be accumulated into an association control list that any suitable mobile device can incorporate to provide enhanced security.

FIG. 8 illustrates a methodology 800 that facilitates providing security in relation to a mobile device on a wireless network that utilizes an access point. At reference numeral 802, a valid access point address can be determined. At reference numeral 804, an invalid access point address can be determined. It is to be appreciated that the determination of the valid and/or invalid access point addresses can be by a user and/or a network administrator. At reference numeral 806, a detection system can be utilized to determine a rogue and/or invalid access point and/or access point address.

At reference numeral 808, an association control list can be created. The association control list can be created based at least in part upon the determination of valid and/or invalid access point addresses. At reference numeral 810, the association control list can be utilized to allow wireless connectivity for a mobile device. In other words, the mobile device can wirelessly connect to an access point solely if the access point is considered a valid access point and/or valid access point address. The mobile device, can be, but is not limited to, a computer, a laptop, a network, a wireless keyboard, a wireless speaker, a mouse, a monitor, a router, an access point, a printer, a hard drive, a modem, a cell phone, a portable digital assistant (PDA), a smart phone, a hand held, and/or any device that utilizes a wireless connection that relates to the access point. The wireless connection can be, but is not limited to, wireless local area network (WLAN), BLUETOOTH®, wireless fidelity (WiFi), ultra wideband, etc.

Figure 9:
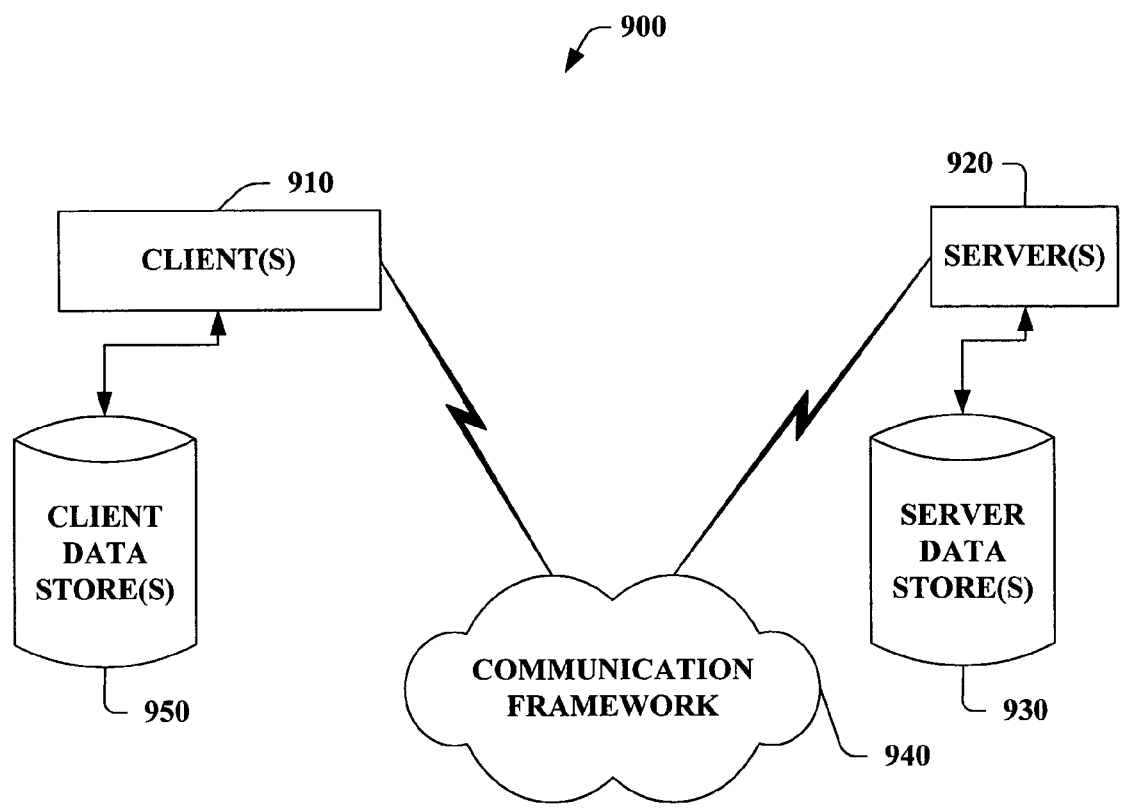
FIG. 9 illustrates an exemplary networking environment, wherein the novel aspects of the claimed subject matter can be employed.
Figure 10:
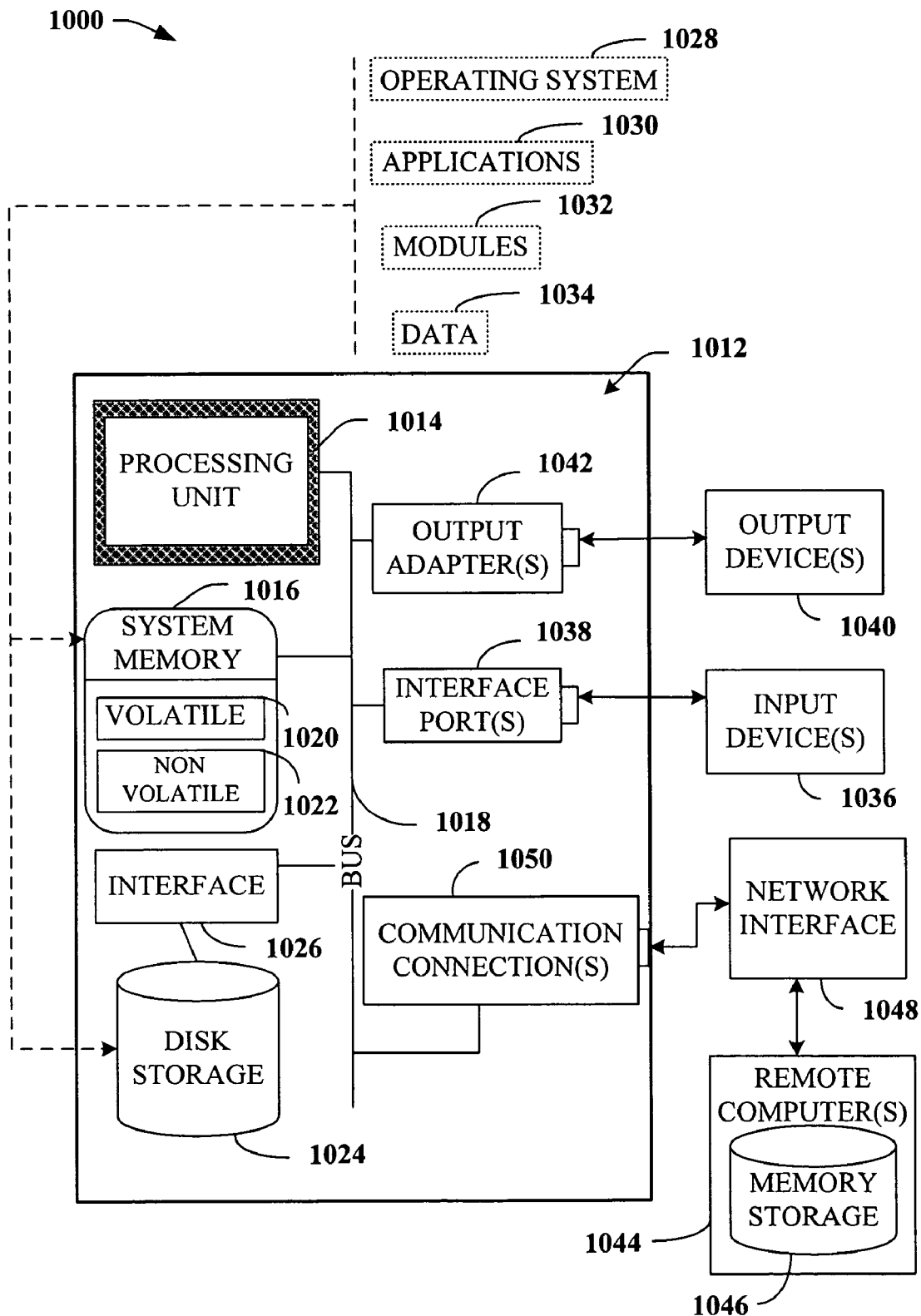
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates enhancing security in a wireless network, comprising:
    a wireless component that establishes a wireless connection between a mobile device to at least one access point; and
    a security component that creates one or more association control lists associated with a portion of a wireless network and utilizes an association control list specific to the wireless connection that provides at least one of a valid access point to which the mobile device can connect or a rogue access point to which the mobile device is not to connect.

2. The system of claim 1, the mobile device is one of the following: a computer; a laptop; a network; a wireless keyboard; a wireless speaker; a mouse; a monitor; a router; an access point; a printer; a hard drive; a modem; a cell phone; a portable digital assistant (PDA); a smart phone; a hand held; and a device that utilizes a wireless connection that relates to the access point.

3. The system of claim 1, the wireless connection is a wireless local area network (WLAN); a wireless fidelity (WiFi); or an ultra wideband.

4. The system of claim 1, the association control list is incorporated into the mobile device.

5. The system of claim 1, the association list is at least one of an IP address or a media access control (MAC) address of the access points.

6. The system of claim 1, the association list is at least one of a range of IP addresses or a range of media access control (MAC) addresses of the access points.

7. The system of claim 1, the association list is at least one of an IP address or a media access control (MAC) address with a wild card character to associate with at least one disparate media access control (MAC) address.

8. The system of claim 1, the security component further comprises a data store that stores the association control list.

9. The system of claim 8, wherein the data store provides storage for at least one of addresses, IP addresses, access points, mobile devices, usernames, passwords or network information.

10. The system of claim 1, further comprising a detection component that detects at least one of a rogue access point or a rogue access point IP address.

11. The system of claim 10, at least one of the detected rogue access point or detected rogue access point IP address is added to the association control list as a rogue access point.

12. The system of claim 1, the association control list is a list of invalid IP addresses that reference the rogue access point.

13. The system of claim 1, the association control list is a list of valid Internet protocol (IP) addresses that reference the valid access point.

14. The system of claim 1, the security component further provides an additional security technique that is one of the following: a user name and password; a personal identification number (PIN); a biometric indicia; a human interactive proof (HIP); or a voice recognition.

15. The system of claim 1, further comprising an intelligent component that employs a probabilistic and/or statistical-based analysis to prognose or infer an action to be automatically performed.

16. A computer-implemented method that facilitates enhancing security associated with a mobile device, comprising:
    determining a valid access point address;
    determining an invalid access point address;
    creating one or more association control lists associated with a portion of a wireless network based in part on the determination; and
    utilizing at least one of the one or more association control lists to determine a valid access point that the mobile device can connect to.

17. The method of claim 16, further comprising:
    utilizing a detection system to determine the invalid access point; and
    creating an association control list to incorporate into the mobile device based at least in part upon the determination of the detection system.

18. A computer-implemented system that facilitates enhancing security associated with a mobile device, comprising:
    means for utilizing a wireless connection between a mobile device and at least one access point;
    means for creating one or more association control lists that provide at least one of a valid access point or a rogue access point; and
    means for utilizing at least one of the one or more association control lists specific to a portion of a wireless network to determine at least one of a valid access point to which the mobile device can connect or a rogue access point to which the mobile device is not to connect.

* * * * *